US011955300B2

(12) United States Patent
Sato et al.

(10) Patent No.: US 11,955,300 B2
(45) Date of Patent: Apr. 9, 2024

(54) SWITCH

(71) Applicant: Mitsubishi Electric Corporation, Tokyo (JP)

(72) Inventors: Motohiro Sato, Tokyo (JP); Kazuki Sugino, Tokyo (JP); Yuji Yoshitomo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 214 days.

(21) Appl. No.: 17/626,934

(22) PCT Filed: Jul. 31, 2019

(86) PCT No.: PCT/JP2019/030003

§ 371 (c)(1),
(2) Date: Jan. 13, 2022

(87) PCT Pub. No.: WO2021/019724

PCT Pub. Date: Feb. 4, 2021

(65) Prior Publication Data

US 2022/0262584 A1 Aug. 18, 2022

(51) Int. Cl.
*H01H 33/664* (2006.01)
*H01H 33/666* (2006.01)

(52) U.S. Cl.
CPC ...... *H01H 33/664* (2013.01); *H01H 33/6662* (2013.01)

(58) Field of Classification Search
CPC .. H01H 33/664; H01H 33/6662; H01H 33/42; H01H 33/666; H01H 33/66; H01H 13/02; H01H 13/24; H01H 13/32
(Continued)

(56) References Cited

U.S. PATENT DOCUMENTS 6,870,451 B1 * 3/2005 Inoue ................. H01H 33/6662 335/238
10,825,625 B1 * 11/2020 Marshall ............ H01H 33/6662
(Continued)

FOREIGN PATENT DOCUMENTS

EP 3761337 A1 1/2021
JP 2001210195 A 8/2001
(Continued)

OTHER PUBLICATIONS

International Search Report (PCT/ISA/210) with translation and Written Opinion (PCT/ISA/237) dated Oct. 21, 2019, by the Japan Patent Office as the International Searching Authority for International Application No. PCT/JP2019/030003.
(Continued)

*Primary Examiner* — William A Bolton
(74) *Attorney, Agent, or Firm* — BUCHANAN INGERSOLL & ROONEY PC

(57) ABSTRACT

A vacuum circuit breaker serving as a switch includes a pair of electrodes that serve as a stationary electrode and a movable electrode, a handler including a movable shaft and a housing that operate as a first mover in withdrawing the movable electrode from the stationary electrode and closing the movable electrode toward the stationary electrode, a movable shaft that is connected as a second mover to the movable electrode, a coil spring that is connected as an elastic between the first mover and the second mover to press the movable electrode against the stationary electrode, and a shock absorber that attenuates as an attenuator contraction of the elastic when the movable electrode is withdrawn from the stationary electrode.

4 Claims, 3 Drawing Sheets

(58) Field of Classification Search
USPC ............ 218/118, 120, 140, 153, 154, 95, 94
See application file for complete search history.

(56) References Cited

U.S. PATENT DOCUMENTS

| | | | | |
|---|---|---|---|---|
| 2015/0084722 | A1* | 3/2015 | Sugiyama .......... | H01H 33/6661 335/154 |
| 2016/0099123 | A1 | 4/2016 | Ohda et al. | |
| 2016/0225557 | A1 | 8/2016 | Kanaya et al. | |

FOREIGN PATENT DOCUMENTS

| | | | |
|---|---|---|---|
| JP | 2002124165 | A | 4/2002 |
| JP | 2015043656 | A | 3/2015 |
| JP | 2017208316 | A | 11/2017 |
| JP | 6513304 | B1 | 5/2020 |
| WO | 2015129115 | A1 | 9/2015 |
| WO | 2016181732 | A1 | 11/2016 |
| WO | 2019167103 | A1 | 9/2019 |

OTHER PUBLICATIONS

Notice of Reasons for Refusal for Japanese Patent Application 2019-567381, dated Mar. 17, 2020 (8 pages).

* cited by examiner

SWITCH

FIELD

The present invention relates to a switch that performs opening and closing of electrodes in a circuit.

BACKGROUND

Some switches include a stationary electrode and a movable electrode is provided with a contact pressure spring that applies contact pressure to the stationary electrode and the movable electrode. When the switch is in a closed state, having the stationary electrode and the movable electrode closed, the contact pressure spring in a contracted state presses the movable electrode against the stationary electrode, thus applying the contact pressure to the stationary electrode and the movable electrode. When the switch performs opening of the stationary electrode and the movable electrode, the contact pressure spring is restored from the contracted state, so that the contact pressure becomes zero. After the contact pressure becomes zero, the movable electrode starts to separate from the stationary electrode.

Patent Literature 1 discloses a switch that includes a contact pressure spring between two movable shafts. One of the two movable shafts is a first movable shaft connected to a movable core of a handler. Another of the two movable shafts is a second movable shaft connected to a movable electrode. The first movable shaft is provided with, at an end opposite from an end connected to the movable core, a housing that houses the contact pressure spring. The second movable shaft is provided with a flange at an end opposite from an end connected to the movable electrode. The flange is connected to one end of the contact pressure spring inside the housing. The contact pressure spring is connected to an internal wall face of the housing at another end.

CITATION LIST

Patent Literature

Patent Literature 1: PCT International Publication No. 2016/181732

SUMMARY

Technical Problem

Since the contact pressure spring according to the above conventional technique described in Patent Literature 1 is connected between the two movable shafts, the contact pressure spring could cause a moving speed differential between the first movable shaft and the second movable shaft. When the handler starts decelerating the movable core, with the movable electrode at a certain distance from the stationary electrode during withdrawal of the movable electrode, the first movable shaft is decelerated along with the movable core. The contact pressure spring contracts under inertial force from the second movable shaft, so that the second movable shaft, on the other hand, does not decelerate but continues moving at the same speed as before the movable core starts decelerating. Even when the handler makes the adjustment to decelerate the movable core, the moving speed differential is thus caused between the first movable shaft and the second movable shaft. Therefore, the speed adjustment that is made by the handler is not reflected in the speed of the movable electrode. Thus, the above conventional technique is problematic in that the speed of the movable electrode is uncontrollable even after the handler makes the speed adjustment.

The present invention has been made in view of the above, and an object of the present invention is to obtain a switch that enables speed of a movable electrode to be controlled in accordance with a speed adjustment that is made by a handler.

Solution to Problem

To solve the above-stated problem and achieve the object, a switch according to the present invention includes: a pair of electrodes that serve as a stationary electrode and a movable electrode; a handler including a first mover that operates in withdrawing the movable electrode from the stationary electrode and closing the movable electrode toward the stationary electrode; a second mover connected to the movable electrode; an elastic that is connected between the first mover and the second mover to press the movable electrode against the stationary electrode; and an attenuator that attenuates contraction of the elastic when the movable electrode is withdrawn from the stationary electrode.

Advantageous Effect of Invention

The switch according to the present invention enables speed of the movable electrode to be controlled in accordance with a speed adjustment that is made by the handler.

DESCRIPTION OF EMBODIMENTS

With reference to the drawings, a detailed description is hereinafter provided with switches according to embodiments of the present invention. It is to be noted that these embodiments are not restrictive of the present invention.

First Embodiment

Figure 1A:
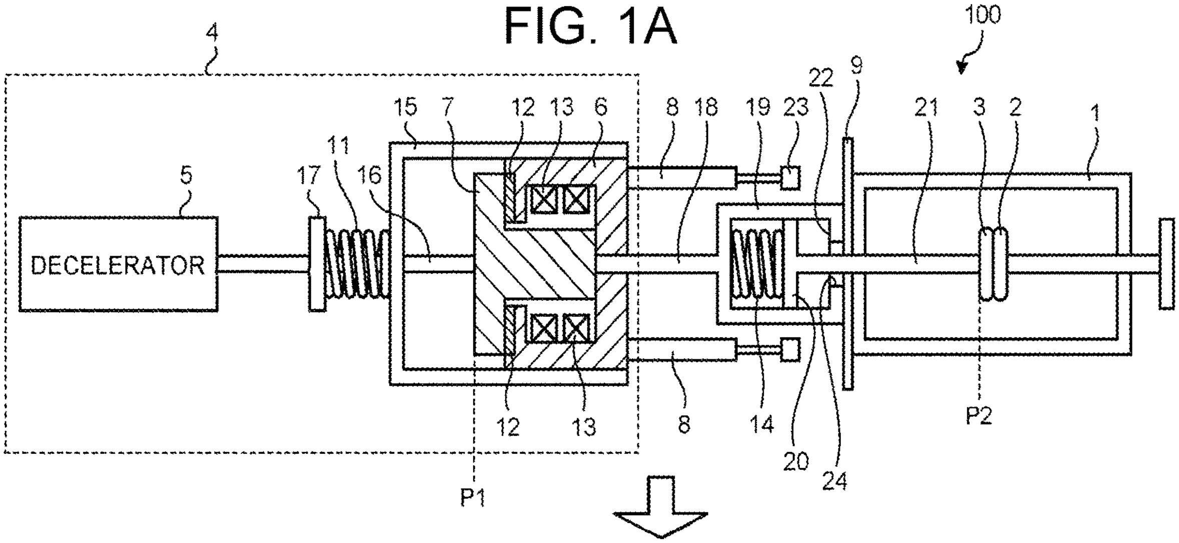
FIGS. 1A and 1B illustrate a vacuum circuit breaker serving as a switch according to a first embodiment of the present invention.
Figure 1B:
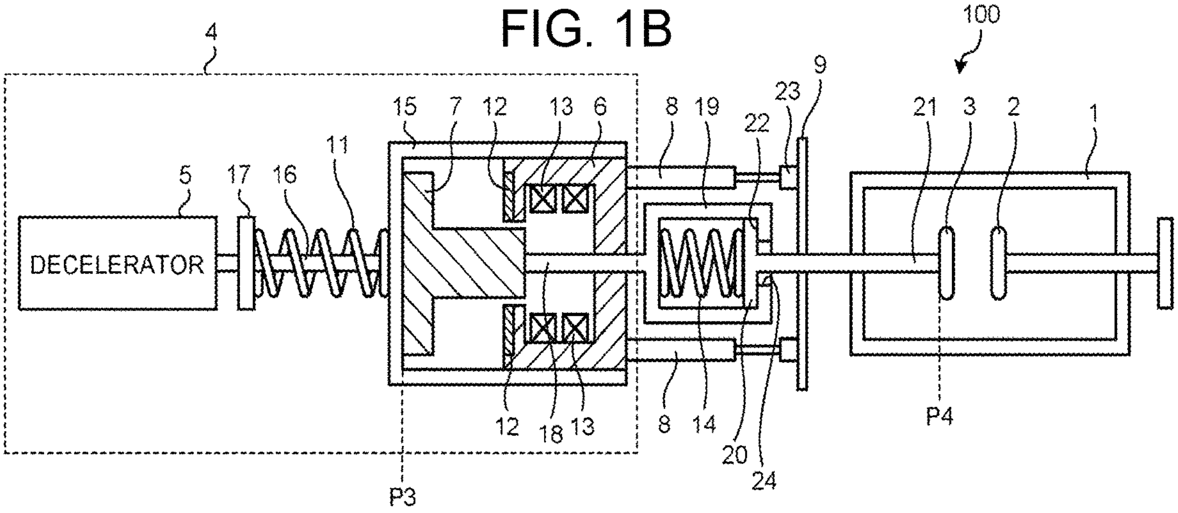

FIGS. 1A and 1B illustrate a switch according to the first embodiment of the present invention, namely, a vacuum circuit breaker. In the vacuum circuit breaker 100, which is the switch according to the first embodiment, opening and closing of a pair of electrodes serving as a stationary electrode 2 and a movable electrode 3 are performed inside a vacuum valve 1 having a higher vacuum. The vacuum valve 1 is a hollow body that is cylindrical. The stationary electrode 2 is fixed inside the vacuum valve 1. The movable electrode 3 is movable with respect to the stationary electrode 2. In a description below, the vacuum circuit breaker 100 may be said to be in a closed state when the stationary electrode 2 and the movable electrode 3 are electrically connected, and the vacuum circuit breaker 100 may be said to be in an open state when the conduction between the stationary electrode 2 and the movable electrode 3 is interrupted.

FIG. 1A illustrates the vacuum circuit breaker 100 in the closed state. FIG. 1B illustrates the vacuum circuit breaker 100 in the open state. In FIGS. 1A and 1B, constituent elements of the vacuum circuit breaker 100 include constituent elements shown in section and constituent elements shown in plan view. Some sections have no hatching.

The vacuum circuit breaker 100 includes a handler 4 that operates to withdraw the movable electrode 3 from the stationary electrode 2 and close the movable electrode 3 toward the stationary electrode 2. The term "withdraw" refers to separating the movable electrode 3, in contact with the stationary electrode 2, from the stationary electrode 2. The term "close" refers to drawing the movable electrode 3 that is away from the stationary electrode 2 to the stationary electrode 2 and establishing contact between the movable electrode 3 and the stationary electrode 2. The handler 4 includes a cylindrical case 15. A cylindrical stationary core 6 and a columnar movable core 7 are housed in the case 15. The stationary core 6 and the movable core 7 are arranged coaxially with each other. The stationary core 6 is fixed inside the case 15. The movable core 7 is movable inside the case 15 with respect to the stationary core 6. The movable core 7 is capable of axial reciprocation. A permanent magnet 12 is provided at a portion of the stationary core 6 to make contact with the movable core 7 in the closed state.

The handler 4 includes a plurality of drive coils 13 for driving the movable core 7. The plurality of drive coils 13 include a withdrawal drive coil 13 and a closing drive coil 13. Each of the drive coils 13 is surrounded by the stationary core 6 and is wound about the axis of the stationary core 6. Each drive coil 13 generates magnetic flux that passes through the stationary core 6 and the movable core 7. The handler 4 is provided with a drive circuit that causes electric current pass through each of the plurality of drive coils 13. The drive circuit is not illustrated in FIGS. 1A and 1B.

A movable shaft 16 is provided at one of axial ends of the movable core 7 that is opposite from another axial end facing the stationary core 6. The movable shaft 16 passes through a hole formed in the case 15, extending out of the case 15. A spring bearing 17 is provided at a portion outside the case 15 of the movable shaft 16. A coil spring 11 is provided as an elastic between the case and the spring bearing 17. The coil spring 11 is connected at one end to an external wall face of the case 15. The coil spring bearing 11 is connected at another end to the spring bearing 17. The movable shaft 16 passes through an interior of the coil spring 11.

The movable shaft 16 is connected to a decelerator 5 at an end opposite from the movable core 7. The decelerator 5 decelerates the movable core 7 during the withdrawal of the movable electrode 3. A dashpot is usable as the decelerator 5.

A movable shaft 18 is provided at the axial end of the movable core 7 that faces the stationary core 6. The movable shaft 18 passes through the stationary core 6, extending out of the case 15. The movable shaft 18 is connected at one end to the movable core 7. A hollow housing 19 is provided at another end of the movable shaft 18. A coil spring 14 is housed as an elastic in the housing 19. The coil spring 14 is a contact pressure spring that presses the movable electrode 3 against the stationary electrode 2. The movable shaft 18 and the housing 19 are constituent elements that move integrally with the movable core 7 and are regarded as a part of the handler 4. The movable shaft 18 and the housing 19 function as a first mover that operates in withdrawing and closing the movable electrode 3. The configuration of the handler 4 in the first embodiment is an example. The configuration of the handler 4 may be appropriately altered.

The housing 19 includes an opening 24 in an end closer to the vacuum valve 1, and a movable shaft 21 passes through the opening 24. The movable shaft 21 is a second mover connected to the movable electrode 3. The movable shaft 21 extends out of the housing 19 through the opening 24. Inside the vacuum valve 1, the movable shaft 21 is connected to the movable electrode 3 and extends out of the vacuum valve 1. The movable shaft 21 is axially movable while maintaining the vacuum in the vacuum valve 1. The movable electrode 3 is connected to one end of the movable shaft 21. An insulating rod that insulates the movable shaft 21 and the movable electrode 3 from each other is provided between the movable shaft 21 and the movable electrode 3. Illustration of the insulating rod is omitted in FIGS. 1A and 1B.

A flange 20 is provided at another end of the movable shaft 21. The flange 20 is arranged inside the housing 19. An outside diameter of the flange 20 is greater than an inside diameter of the opening 24. In the closed state of the vacuum circuit breaker 100, the flange is positioned away from an internal wall face 22 of the end of the housing 19 that is closer to the vacuum valve 1. In the open state of the vacuum circuit breaker 100, the flange 20 is in contact with the internal wall face 22.

The coil spring 14 is connected at one end to the flange 20. The coil spring 14 is connected at another end to an internal wall face of the housing 19 that is closer to the handler 4. In other words, the coil spring 14 is connected between the first mover and the second mover. An elastic other than the coil spring 14 may be connected between the first mover and the second mover. Such an elastic may be a spring other than the coil spring 14, such as a disk spring or a flat spring. The elastic in the vacuum circuit breaker 100 may be an elastic other than the spring.

The handler 4 is provided with a shock absorber 8. The shock absorber 8 is an attenuator that attenuates contraction of the coil spring 14 when the movable electrode 3 is withdrawn from the stationary electrode 2. When force is applied in the direction of the handler 4 to an end 23 of the shock absorber 8 that is closer to the vacuum valve 1, the shock absorber 8 displaces the end 23 toward the handler 4. The shock absorber 8 generates resisting force against the force applied to the end 23, thus decelerating moving speed of the moving end 23.

The movable shaft 21 is provided with a flat plate 9 at a portion between the vacuum valve 1 and the housing 19. The movable shaft 21 passes through the flat plate 9. The flat plate 9 is fixed to the movable shaft 21. The flat plate 9 moves integrally with the movable shaft 21. In the closed state of the vacuum circuit breaker 100, the end 23 and the flat plate 9 face each other. In the open state of the vacuum circuit breaker 100, the end 23 is in contact with the flat plate 9.

A description is provided next of operation of the vacuum circuit breaker 100. Position P1 denotes a position of the movable core 7 in the closed state. Position P2 denotes a position of the movable electrode 3 in the closed state. Position P3 denotes a position of the movable core 7 in the open state. Position P4 denotes a position of the movable electrode 3 in the open state.

In a process the movable electrode 3 is being withdrawn from the stationary electrode 2: the movable core 7 shifts from position P1 to position P3; and the movable electrode

3 shifts from position P2 to position P4. In a process the movable electrode 3 is being closed toward the stationary electrode 2: the movable core 7 shifts from position P3 to position P1; and the movable electrode 3 shifts from position P4 to position P2. In a description below, the movable core 7 may be said to be shifting in an opening direction when the movable electrode 3 is being withdrawn, and the movable core 7 may be said to be shifting in a closing direction when the movable electrode 3 is being closed. The closing direction is opposite to the opening direction.

In the closed state of the vacuum circuit breaker 100: the movable core 7 is attracted to the permanent magnet 12 by magnetic force of the permanent magnet 12; with the movable core 7 being attracted to the permanent magnet 12, the end of the movable core 7 that is closer to the stationary core 6 is in contact with the stationary core 6; the movable shaft 18 is at a position that is closest to the vacuum valve 1 in an axial moving range of the movable shaft 18; the flat plate 9 is sandwiched between the housing 19 and an external wall face of the vacuum valve 1; the coil spring 14 is contracted between the internal wall face of the housing 19 and the flange 20; and the movable shaft 21 presses the movable electrode 3 against the stationary electrode 2 due to reaction force of the coil spring 14.

In the closed state of the vacuum circuit breaker 100: coil spring 11 is contracted between the external wall face of the case 15 and the spring bearing 17; the coil spring 11 applies reaction force to the spring bearing 17; and the vacuum circuit breaker 100 maintains the closed state because the force the movable core 7 is attracted to the permanent magnet 12 is greater than the reaction force of the coil spring 11.

When the vacuum circuit breaker 100 is in the closed state, the handler 4 causes electric current to flow through the withdrawal drive coil 13 in response to a withdrawal operation command input to the handler 4. The operation command is input to the handler 4 from a control panel that controls the vacuum circuit breaker 100. The control panel is not illustrated in FIGS. 1A and 1B.

With the current flowing through the withdrawal drive coil 13, the withdrawal drive coil 13 generates electromagnetic force that can counteract the magnetic force of the permanent magnet 12. The magnetic force of the permanent magnet 12 weakens by being counteracted by the generated electromagnetic force of the withdrawal drive coil 13. When the reaction force of the coil spring 11 becomes greater than the force that causes the movable core 7 to be attracted to the permanent magnet 12 due to the weakened magnetic force of the permanent magnet 12, the coil spring 11 is restored from the contracted state to a state of its equilibrium length, shifting the spring bearing 17 in the opening direction. The movable shaft 16 and the movable core 7 move in the opening direction along with the spring bearing 17. This is how the movable core 7 of the vacuum circuit breaker 100 is moved in the opening direction.

The movable shaft 18 and the housing 19 move in the opening direction along with the movable core 7. The movement of the housing 19 in the opening direction gradually decreases a distance between the flange 20 and the internal wall face 22 and causes the coil spring 14 to stretch. The stretching of coil spring 14 lessens contact pressure between the stationary electrode 2 and the movable electrode 3. The movable shaft 18 and the housing 19 move further in the opening direction after the flange 20 contacts the internal wall face 22; accordingly, the movable shaft 21 moves in the opening direction along with the movable shaft 18 and the housing 19. As the movable shaft 21 moves in the opening direction, the movable electrode 3 is withdrawn from the stationary electrode 2. This is how the vacuum circuit breaker 100 transitions from the closed state to the open state.

The flat plate 9 moves in the opening direction along with the movable shaft 21 and reaches the end 23. The flat plate 9 applies the force to the end 23 in the opening direction. The shock absorber 8 generates the resisting force against the force applied to the end 23. The shock absorber 8 absorbs kinetic energy of the movable shaft 21 by generating the resisting force, thus easing the movable shaft 21. A detailed description of the function of the shock absorber 8 will be provided later.

When the vacuum circuit breaker 100 is in the open state: the handler 4 causes the electric to flow through the closing drive coil 13 in response to a closing operation command input to the handler 4; with the electric current flowing through the closing drive coil 13, the closing drive coil 13 generates electromagnetic force that attracts the movable core 7; and due to the generated electromagnetic force of the closing drive coil 13 and the magnetic force of the permanent magnet 12, the movable core 7 moves in the closing direction while causing the coil spring 11 to contract. As the movable core 7 moves in the closing direction, the movable shaft 18 and the housing 19 move in the closing direction along with the movable core 7. The movable shaft 21 moves in the closing direction along with the housing 19, thus causing the movable electrode 3 to reach the stationary electrode 2. Moreover, the coil spring 14 in the housing 19 is contracted and thus applies the contact pressure to the stationary electrode 2 and the movable electrode 3. This is how the vacuum circuit breaker 100 transitions from the open state to the closed state.

The function of the shock absorber 8 is described here. Suppose that the decelerator 5 starts to decelerate the movable core 7 after the movable electrode 3 is separated from the stationary electrode 2 in the withdrawal of the movable electrode 3. The movable shaft 18 and the housing 19 start to decelerate along with the movable core 7, because the movable shaft 18 and the housing 19 are integral with the movable core 7. When the housing 19 starts decelerating, inertial force caused by the movement of the movable shaft 21 in the opening direction is applied on the coil spring 14. While the housing 19 decelerates, if the coil spring 14 contracts due to the inertial force, the movable shaft 21 does not decelerate but keeps moving at the same speed as before the movable core 7 starts decelerating. Accordingly, the shock absorber 8 attenuates the contraction of the coil spring 14 in the first embodiment, thus decelerating the movable shaft 21.

Figure 2:
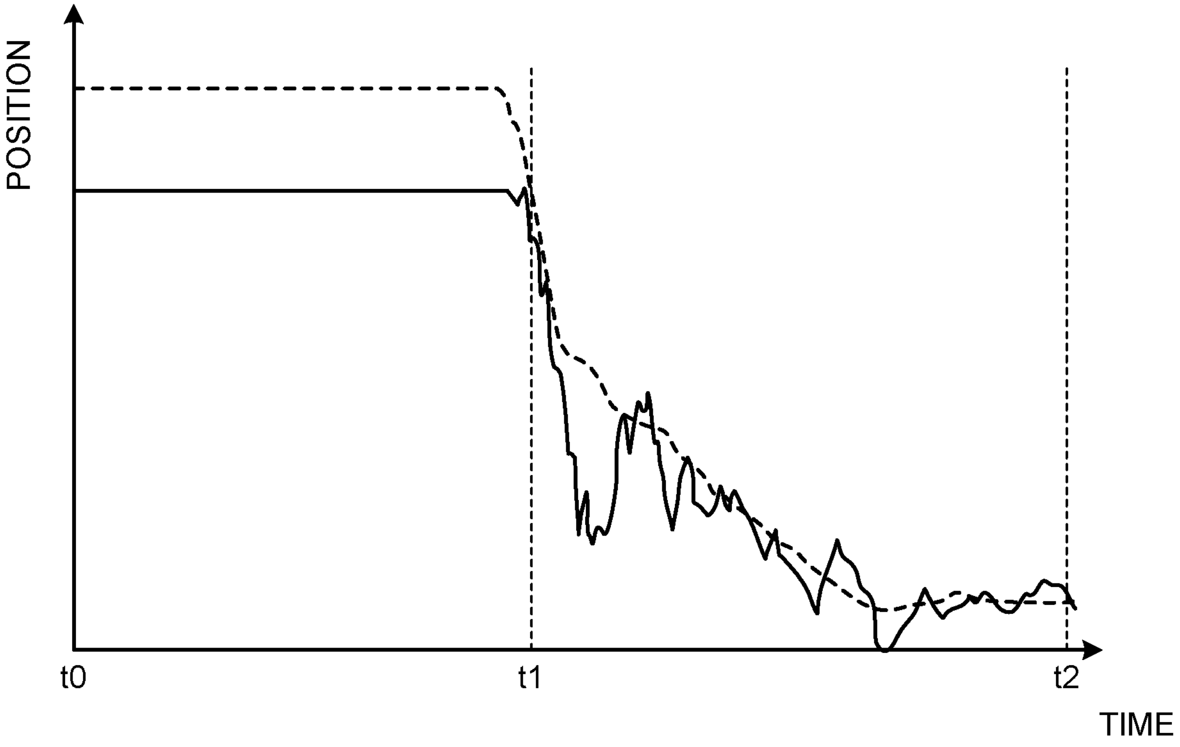
FIG. 2 is used for explaining a function of a shock absorber that is an attenuator of the vacuum circuit breaker illustrated in FIGS. 1A and 1B.

FIG. 2 is used for explaining the function of the shock absorber, which serves as the attenuator of the vacuum circuit breaker illustrated in FIGS. 1A and 1B. FIG. 2 illustrates a waveform representing a relationship between position of the movable shaft 18 and time, and a waveform representing a relationship between position of the movable shaft 21 and the time. The waveform representing the relationship between the position of each of the movable shafts 18 and 21 and the time may hereinafter be referred to as “travel waveform” in a description below.

A broken line graph in FIG. 2 exemplifies the travel waveform of the movable shaft 18 in the withdrawal of the movable electrode 3. A solid line graph exemplifies the travel waveform of the movable shaft 21 in the withdrawal of the movable electrode 3. The travel waveforms illustrated in FIG. 2 indicate a case when the decelerator 5 decelerates the movable core 7 after the separation of the movable electrode 3 from the stationary electrode 2, and no deceleration of the movable shaft 21 is performed by the shock absorber 8.

A vertical axis of the graphs illustrated in FIG. 2 represents the position, and a horizontal axis represents the time. In order to have the travel waveforms of the movable shaft 18 and the movable shaft 21 superimposed for illustration, FIG. 2 has a position on the vertical axis that denotes a position of the movable shaft 18 in the open state aligned with a position on the vertical axis that denotes a position of the movable shaft 21 in the open state.

At time t0, the vacuum circuit breaker 100 is in the closed state. In the closed state of the vacuum circuit breaker 100, the movable shaft 18 and the movable shaft 21 remain in constant positions, respectively. In FIG. 2, a distance between the graph for the movable shaft 18 and the graph for the movable shaft 21 along the vertical axis represents a length of the coil spring 14 contracted from the equilibrium length. At time t0, the movable core 7 is at position P1. At time t0, the movable electrode 3 is at position P2.

The vacuum circuit breaker 100 starts the withdrawal in accordance with the operation command. At time t1, the movable electrode 3 starts to shift in the opening direction from position P2. The movable electrode 3 separates from the stationary electrode 2. As the decelerator 5 starts to decelerate the movable core 7 after time t1, the movable shaft 18 is decelerated along with the movable core 7. On the other hand, the movable shaft 21 lags behind the movable shaft 18 in starting the deceleration because the coil spring 14 contracts. At following time t2, the vacuum circuit breaker 100 is in the open state. At time t2, the movable core 7 is at position P3. At time t2, the movable electrode 3 is at position P4.

In the first embodiment, when the flat plate 9 reaches the end 23 during the movement of the movable shaft 21 in the opening direction, the shock absorber 8 generates the resisting force against the force that is applied in the opening direction by the flat plate 9, thus easing the movement of the flat plate 9 in the opening direction. By easing the movement of the flat plate 9 in the opening direction, the shock absorber 8 suppresses the contraction of the coil spring 14 during the deceleration of the movable shaft 18. This is how the shock absorber 8 attenuates the contraction of the coil spring 14 after the decelerator 5 has started decelerating the movable core 7.

Since the shock absorber 8 attenuates the contraction of the coil spring 14, the vacuum circuit breaker 100 enables the deceleration of the movable shaft 21 to concur with the deceleration of the movable shaft 18. Since the deceleration of the movable shaft 21 is caused to concur with the deceleration of the movable shaft 18, the vacuum circuit breaker 100 enables the speed adjustment that is made by the handler 4 to be accurately reflected in speed of the movable electrode 3. The travel waveform of the movable shaft 21 approximates the travel waveform of the movable shaft 18.

In the vacuum circuit breaker 100, a longitudinal magnetic field may be generated between the stationary electrode 2 and the movable electrode 3. The longitudinal magnetic field generated causes an arc that occurs between the stationary electrode 2 and the movable electrode 3 during interruption to extend over entire electrode faces, so that electric current density by the arc discharge lowers. With the lower electric current density, melting of the stationary electrode 2 and the movable electrode 3 is suppressed. Since vapor that results from the melting is suppressed, easy current interruption is possible in the vacuum circuit breaker 100. The vacuum circuit breaker 100 may be provided with electrodes that generate the longitudinal magnetic field. The electrodes that generate the longitudinal magnetic field are not illustrated in FIGS. 1A and 1B.

Decelerating the movable electrode 3 during the withdrawal of the movable electrode 3 from the stationary electrode 2 enables improved interruption performance of the longitudinal magnetic field in the vacuum circuit breaker 100. Where the deceleration of the movable electrode 3 is required thus, the vacuum circuit breaker 100 enables the movable electrode 3 to decelerate in accordance with the speed adjustment that is made by the handler 4. Since the movable electrode 3 is decelerated in accordance with the speed adjustment that is made by the handler 4, the vacuum circuit breaker 100 is capable of achieving a higher interruption performance.

The attenuator of the vacuum circuit breaker 100 may be a mechanism other than the shock absorber 8 as far as the mechanism: generates resisting force against the force applied on the elastic in conjunction with the movement of the movable shaft 21; and attenuates the contraction of the elastic. The attenuator may be a mechanism such as a dashpot or a mechanical linkage. The switch according to the first embodiment may be a circuit breaker other than the vacuum circuit breaker 100 or a disconnector.

The switch according to the first embodiment includes the attenuator that attenuates the contraction of the elastic when the movable electrode 3 is withdrawn from the stationary electrode 2 and thus enables the movable electrode 3 to decelerate in accordance with the speed adjustment that is made by the handler 4. Therefore, the switch enables the speed of the movable electrode 3 to be controlled in accordance with the speed adjustment that is made by the handler 4.

Second Embodiment

Figure 3A:
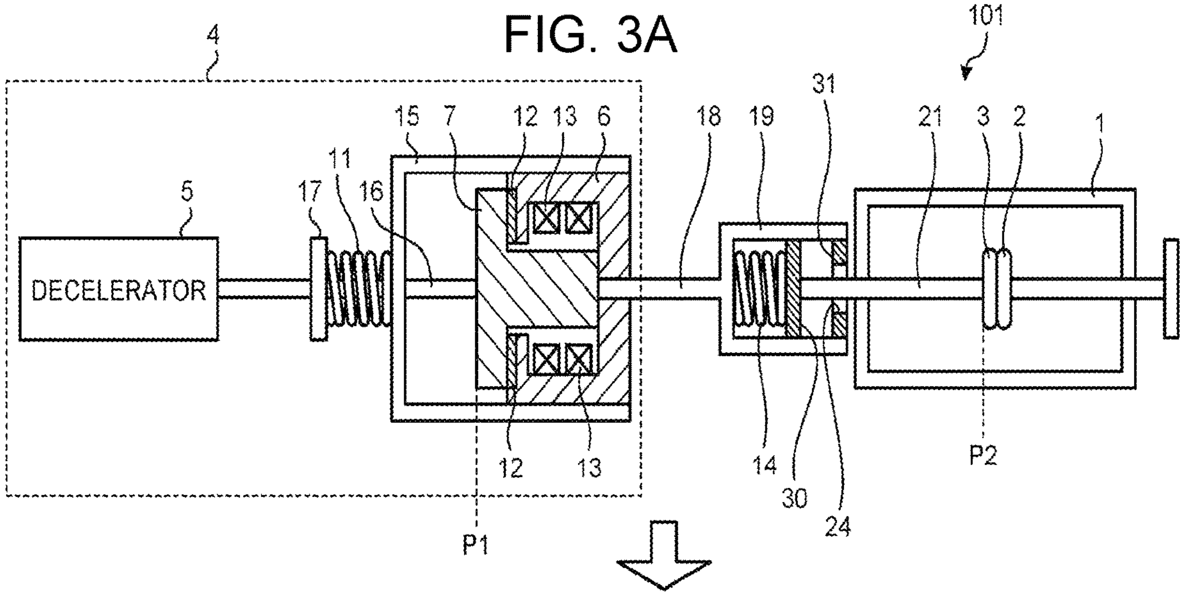
FIGS. 3A and 3B illustrate a vacuum circuit breaker serving as a switch according to a second embodiment of the present invention.
Figure 3B:
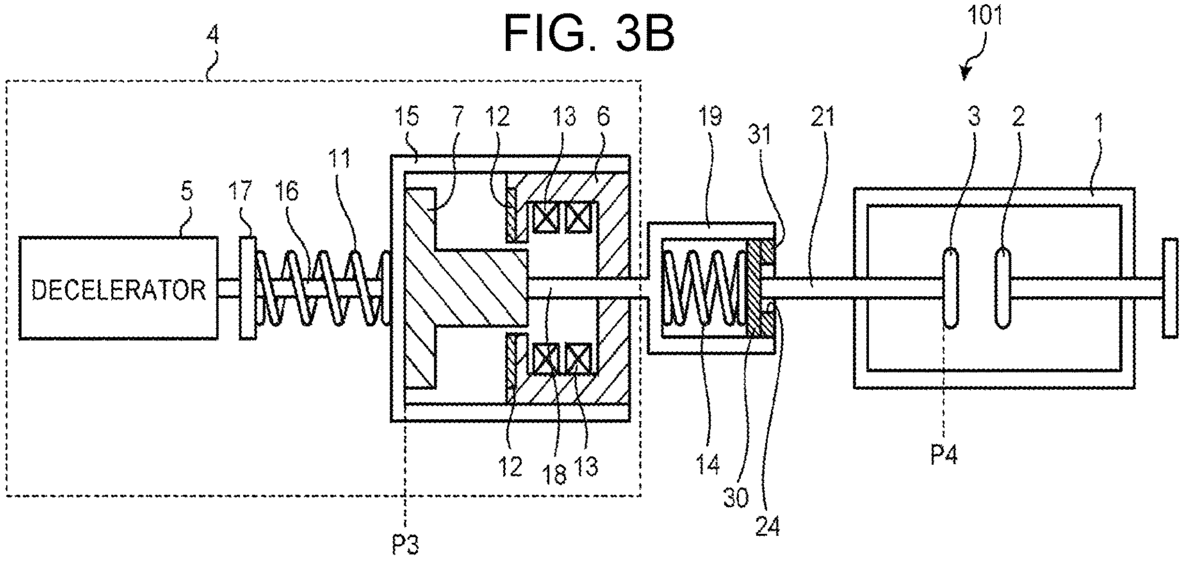

FIGS. 3A and 3B illustrate a switch according to the second embodiment of the present invention, namely, a vacuum circuit breaker. The vacuum circuit breaker 101, which is the switch according to the second embodiment, includes a permanent magnet and a magnetic substance constituting the attenuator. In the second embodiment, constituent elements identical with those in the above-described first embodiment have the same reference characters, and a description is provided mainly of difference from the first embodiment.

FIG. 3A illustrates the vacuum circuit breaker 101 in a closed state. FIG. 3B illustrates the vacuum circuit breaker 101 in an open state. In FIGS. 3A and 3B, constituent elements of the vacuum circuit breaker 101 include constituent elements shown in section and constituent elements shown in plan view. Some sections have no hatching.

The movable shaft 21 is provided with, at the end in an opening direction, a flange 30 that serves as the permanent magnet. The flange 30 corresponds to the permanent magnet. The housing 19 has, in a closing direction, an end 31 that is a magnetic substance. The end 31 has the opening 24 through which the movable shaft 21 is passed. In the vacuum circuit breaker 101, the housing 19 as the first mover is provided with the magnetic substance; and the movable shaft 21 as the second mover is provided with the permanent magnet. In the closed state of the vacuum circuit breaker 101, the flange 30 is positioned away from the end 31 of the housing 19. In the open state of the vacuum circuit breaker 101, the flange 30 is in contact with the end 31.

A description is provided next of operation of the vacuum circuit breaker 101. When the movable electrode 3 is withdrawn, the movable shaft 18 and the housing 19 move in the opening direction along with the movable core 7. The movement of the housing 19 in the opening direction gradually decreases a distance between the flange 30 and the end 31 and causes the coil spring 14 to stretch. The movable shaft 18 and the housing 19 move further in the opening direction after the flange 30 contacts the end 31; accordingly, the movable shaft 21 moves in the opening direction along with the movable shaft 18 and the housing 19.

Suppose that the decelerator 5 starts to decelerate the movable core 7 after the movable electrode 3 is separated from the stationary electrode 2. The movable shaft 18 and the housing 19 start decelerating along with the movable core 7. In the second embodiment, the end 31 is attracted to the flange 30 by magnetic force of the flange 30 after the flange 30 contacts the ends 31. Since the end 31 is attracted to the flange 30, separation of the flange 30 from the end 31 is suppressed in a state the inertial force is applied to the movable shaft 21 in the opening direction. With the maintained contact between the flange 30 and the end 31, contraction of the coil spring 14 is suppressed during the deceleration of the movable shaft 18. This is how the flange 30 and the end 31 attenuate the contraction of the coil spring 14 after the decelerator 5 has started decelerating the movable core 7. The attenuator attenuates the contraction of the elastic by having the magnetic substance attracted to the permanent magnet.

In the second embodiment, the attenuator that includes the flange 30 as the permanent magnet and the end 31 as the magnetic substance is non-limiting. The entire flange 30 that serves as the permanent magnet is non-limiting. The attenuator may include a permanent magnet as a portion of the flange 30. Not only the end 31 but also any other portion of the housing 19 may serve as the magnetic substance of the attenuator. The entire housing 19 may serve as the magnetic substance. In the second embodiment, the housing 19 of the first mover and the movable shaft 21, which is the second mover, may be provided with the permanent magnet and the magnetic substance, respectively. The switch according to the second embodiment may be a circuit breaker other than the vacuum circuit breaker 101 or a disconnector.

The switch according to the second embodiment: includes the attenuator that attenuates the contraction of the elastic when the movable electrode 3 is withdrawn from the stationary electrode 2; and thus enables the movable electrode 3 to decelerate in accordance with the speed adjustment that is made by the handler 4. Therefore, the switch enables the speed of the movable electrode 3 to be controlled in accordance with the speed adjustment that is made by the handler 4.

The above configurations illustrated in the embodiments are illustrative of contents of the present invention, can be combined with other techniques that are publicly known, and can be partly omitted or changed without departing from the gist of the present invention.

REFERENCE SIGNS LIST

1 vacuum valve; 2 stationary electrode; 3 movable electrode; 4 handler; 5 decelerator; 6 stationary core; 7 movable core; 8 shock absorber; 9 flat plate; 11, 14 coil spring; 12 permanent magnet; 13 drive coil; 15 case; 16, 18, 21 movable shaft; 17 spring bearing; 19 housing; 20, 30 flange; 22 internal wall face; 23, 31 end; 24 opening; 100, 101 vacuum circuit breaker.

The invention claimed is:

1. A switch comprising:

a pair of electrodes serving as a stationary electrode and a movable electrode;

a handler including a first mover to operate in withdrawing the movable electrode from the stationary electrode and closing the movable electrode toward the stationary electrode;

a second mover connected to the movable electrode;

an elastic connected between the first mover and the second mover to press, in a contracted state, the movable electrode against the stationary electrode; and an attenuator to attenuate contraction of the elastic when the movable electrode is withdrawn from the stationary electrode after the elastic has stretched from the contracted state, wherein the attenuator attenuates contraction of the elastic that is caused by continued movement of the second mover as opposed to deceleration of the first mover.

2. The switch according to claim 1, wherein when attenuating contraction of the elastic, the attenuator generates resisting force against force that is applied on the elastic as the second mover moves.

3. The switch according to claim 1, wherein the attenuator includes:

a permanent magnet at one of the first mover and the second mover; and a magnetic substance at another of the first mover and the second mover, and wherein the attenuator attenuates contraction of the elastic by attracting the magnetic substance to the permanent magnet.

4. A switch comprising:

a pair of electrodes serving as a stationary electrode and a movable electrode;

a handler including a first mover to operate in withdrawing the movable electrode from the stationary electrode and closing the movable electrode toward the stationary electrode;

a second mover connected to the movable electrode;

an elastic connected between the first mover and the second mover to press the movable electrode against the stationary electrode; and an attenuator to attenuate contraction of the elastic when the movable electrode is withdrawn from the stationary electrode, wherein the attenuator includes a permanent magnet at one of the first mover and the second mover and a magnetic substance at another of the first mover and the second mover and has the magnetic substance attracted to the permanent magnet when attenuating contraction of the elastic.

* * * * *